United States Patent
Wallin

(10) Patent No.: US 11,230,943 B2
(45) Date of Patent: Jan. 25, 2022

(54) AIRCRAFT TURBINE REAR STRUCTURES

(71) Applicant: GKN Aerospace Sweden AB, Trollhättan (SE)

(72) Inventor: Fredrik Wallin, Trollhättan (SE)

(73) Assignee: GKN Aerospace Sweden AB, Trollhättan (SE)

(*) Notice: Subject to any disclaimer, the term of this patent is extended or adjusted under 35 U.S.C. 154(b) by 0 days.

(21) Appl. No.: 16/761,836

(22) PCT Filed: Nov. 6, 2018

(86) PCT No.: PCT/EP2018/080306
§ 371 (c)(1),
(2) Date: May 6, 2020

(87) PCT Pub. No.: WO2019/091965
PCT Pub. Date: May 16, 2019

(65) Prior Publication Data
US 2021/0199019 A1 Jul. 1, 2021

(30) Foreign Application Priority Data
Nov. 7, 2017 (GB) .................................. 1718405

(51) Int. Cl.
*F01D 17/14* (2006.01)
*F01D 9/04* (2006.01)
(Continued)

(52) U.S. Cl.
CPC ........... *F01D 17/141* (2013.01); *F01D 9/041* (2013.01); *F05D 2220/323* (2013.01); *F05D 2230/30* (2013.01); *F05D 2230/60* (2013.01)

(58) Field of Classification Search
CPC .......... F01D 5/142; F01D 5/143; F01D 5/145; F01D 5/146; F01D 25/30; F01D 25/162;
(Continued)

(56) References Cited

U.S. PATENT DOCUMENTS 6,502,383 B1 * 1/2003 Janardan .................. F02K 1/46
60/226.1
7,195,456 B2    3/2007 Aggarwala et al.
(Continued)

FOREIGN PATENT DOCUMENTS

| WO | 2008060195 A1 | 5/2008 |
| WO | 2015057409 A1 | 4/2015 |
| WO | 2015142200 A1 | 9/2015 |

OTHER PUBLICATIONS

International Search Report and Written Opinion for PCT/EP2018/080306 dated Feb. 12, 2019 (15 pages).

*Primary Examiner* — J. Todd Newton
*Assistant Examiner* — Eric J Zamora Alvarez
(74) *Attorney, Agent, or Firm* — Bejin Bieneman PLC

(57) ABSTRACT

A turbine rear structure for a gas turbine engine includes a central hub and a circumferential outer ring coaxial with the central hub. The turbine rear structure further includes a plurality of guide vanes extending radially between the central hub and the circumferential outer ring, and an intermediate guide vane located in a space defined between adjacent guide vanes. The intermediate guide vane is located closer to one of the guide vanes than the other guide vane.

19 Claims, 12 Drawing Sheets

(51) Int. Cl.
*F01D 5/14* (2006.01)
*F01D 25/30* (2006.01)

(58) Field of Classification Search
CPC . F01D 9/02; F01D 9/041; F01D 25/24; F01D 25/28; F01D 17/141; F04D 29/542; F04D 29/544; F04D 29/667; F04D 29/444; F04D 29/448; F04D 29/547; F05D 2240/12; F05D 2220/32; F05D 2220/323; F05D 2230/30; F05D 2230/60; F05D 2240/127; F05D 2240/14
See application file for complete search history.

(56) References Cited

U.S. PATENT DOCUMENTS

| | | | |
|---|---|---|---|
| 8,087,250 B2* | 1/2012 | Gutmark | F02K 1/386 |
| | | | 60/770 |
| 2006/0024158 A1 | 2/2006 | Hoeger et al. | |
| 2010/0158684 A1* | 6/2010 | Baralon | F01D 9/065 |
| | | | 415/208.1 |
| 2016/0222807 A1* | 8/2016 | Liebl | B22F 5/04 |
| 2017/0130610 A1* | 5/2017 | Nanda | F01D 25/30 |
| 2018/0156124 A1 | 6/2018 | Clements et al. | |

* cited by examiner

Main vane suction peak

AIRCRAFT TURBINE REAR STRUCTURES

CROSS-REFERENCE TO RELATED APPLICATIONS

This application is a national stage of, and claims priority to, Patent Cooperation Treaty Application No. PCT/EP2018/080306, filed on Nov. 6, 2018, which application claims priority to Great Britain Application No. GB 1718405.2, filed on Nov. 7, 2017, which applications are hereby incorporated herein by reference in their entireties.

BACKGROUND

In a gas turbine engine of the type used in commercial aircraft, a gas turbine generates the thrust for the aircraft. Air is received at the front of the engine, compressed, and mixed with fuel before being ignited and generating a flow of high-speed exhaust gases. Because of the continuous rotation of the blades within the engine, the gases similarly swirl or circulate around the axis of the engine. It is advantageous to compensate for this swirl so as to direct gases out of the rear of the engine in a direction opposite to that of flight. This maximizes the thrust that is generated since the gas flows in a direction parallel with the axis of the engine.

In order to change the direction of flow (i.e., to turn the exhaust gas flow) the rear section of the engine (after the turbine) contains a row of static outlet guide vanes that are arranged to turn the exhaust gas from a circulating or swirling direction of flow into a substantially axial direction of flow out of the rear of the engine. Such vanes are commonly used to increase the thrust from the engine.

However, there is a limit to how much the vanes can be contoured to turn the exhaust gas. Too great an angle and the exhaust gas is inhibited from leaving the engine at high speed. In effect the vanes become a restriction in the exhaust gas path. There is therefore a trade-off or balance in engine design between optimising the thrust generated from the exhaust gas against inhibiting the exhaust gas flow from the engine.

As engines become more and more powerful (i.e., increasing the power output from the turbine), the exhaust gases have ever increasing components of circular flow (or swirl) and this causes reductions in efficiencies at the exhaust of the engine where all of the circular flow component (swirl) cannot be changed without limiting the exhaust gas flow. The matter is further complicated by separation of exhaust gas occurring at the surfaces of the turning vanes. "Separation" means that exhaust gas is not turned according to the profile of the vanes but instead detaches from the surface further limiting the amount of de-swirling (i.e., the removal of the exhaust gas rotational velocity component) in a conventional engine design.

SUMMARY OF THE INVENTION

The present disclosure is concerned with an improved gas turbine structure and specifically, but not exclusively, to a turbine rear structure (TRS).

A turbine rear structure for a gas turbine engine comprises a central hub and a circumferential outer ring. The turbine rear structure further includes a first group of guide vanes extending between the central hub and circumferential outer ring and a second group of guide vanes located between adjacent vanes of said first group, and wherein the second group of guide vanes are located asymmetrically with respect to adjacent vanes of said first group.

The second group of vanes are termed 'splitter vanes' or 'intermediate vanes' throughout this description. In effect, the second group of splitter vanes divide the spaces between adjacent vanes in the first group into two separate flows through the TRS. Exhaust gas flows on either side of each of the splitter vanes.

Each of the vanes in the first group of vanes is configured to cause exhaust gas passing over the respective vane to change direction, i.e., the vanes each have an aerodynamic profile or shape which is designed to cause exhaust gas entering the TRS to leave the TRS with a reduced component of swirl. This is achieved by providing each vane with a smooth aerodynamic shape.

The second group of splitter vanes substantially enhances the way in which the exhaust gas direction can be changed through the TRS. Put another way, the splitter vanes improve the de-swirling effect through the TRS.

The splitter vanes also have an aerodynamic profile to effect turning and de-swirling and have a shape that generally complements the operation of the first group of vanes.

As well as an aerodynamic profile, the splitter vanes may be specifically positioned between adjacent vanes in the first group.

For example, adjacent vanes of said first group may comprise an upstream vane in an exhaust gas direction and wherein the second group of vanes are positioned closer to an upstream vane than a downstream vane of said first group. The term "upstream" is intended to refer to a vane against which the exhaust gas first strikes the leading edges of the vane. For example, if the swirl is in a clockwise direction, the exhaust gas will impinge on successive vanes in a clockwise direction. Here, the splitter vanes may be located closer to the vane against which the exhaust gas impinges first.

The second group of vanes may be positioned approximately $\frac{1}{3}^{rd}$ of the distance, plus or minus $\frac{1}{6}$th of the distance, across the space defined between adjacent vanes of said first group measured from an upstream vane of said first group.

The distance is measured around the circumference of a circle extending between the vanes rather than a straight line between adjacent vanes. Placing the splitter vanes at this position optimises the turning effect of the TRS.

One or more of the first group of vanes may be load bearing vanes connecting the central hub and the circumferential outer ring. These are, in effect, conventional vanes of a TRS and provide the load bearing path between the central hub and circumferential outer ring. Additionally, one or more of the second group of vanes may also be load bearing vanes connecting the central hub and the circumferential outer ring or may be non-load bearing vanes, i.e., their function is purely aerodynamic.

The second group of vanes may extend across the whole distance between the central hub and the circumferential outer ring. Alternatively, the second group of vanes may extend a predetermined distance from the central hub. Thus, the second group of vanes may only be coupled at a first end to the central hub and have an opposing radially extending end terminating a predetermined radius from the central hub. Advantageously, this prevents any thermally induced loading on the vanes in the second group since the vane is permitted to expand within the TRS.

The second group of vanes may additionally extend in an axial direction of the turbine rear structure to a distance between 20% and 100% of the full chord-length of the first group of vanes measured from a leading edge of the first group of vanes. Thus, the splitter vanes may be shorter and smaller than the first group of vanes, which may be load bearing.

The second group of vanes may be arranged so that their leading edges align with the leading edges of the vanes in the first group.

Alternatively, a leading edge of the second group of vanes may be displaced in an axial direction of the turbine rear structure so that the leading edge of the second group of vanes is downstream of the leading edge of the first group of vanes in an exhaust gas flow direction.

Alternatively, a leading edge of the second group of vanes may be displaced in an axial direction of the turbine rear structure so that the leading edge of the second group of vanes is upstream of the leading edge of the first group of vanes in an exhaust gas flow direction. In effect, the second group of vanes may extend beyond a plane defined by the leading edges of the first set of vanes.

Thus, depending on the engine characteristics the turning effect of the splitter vanes may be fully optimized. Furthermore, alternating splitter vanes around the circumference of the TRS may alternate between the two displacements adding a further dimension to optimisation, i.e., adjacent vanes alternating between an upstream and a downstream position.

Because of the aerodynamic shape of the vanes in the first group of vanes required to turn the exhaust gas, each vane comprises one side with a convex shape and an opposing side with a concave shape. As high-speed exhaust gas passes over the surface of the convex side, there is a tendency or possibility for the gas flow to separate from the convex surface. Thus, an outer convex surface of each of said first group of vanes has a region of maximum negative pressure at a portion of its surface. Advantageously, each of said second group of vanes may be arranged to overlap said region of maximum negative pressure.

Overlapping a splitter vane over the point or region of maximum negative pressure (termed a "suction peak" herein) prevents or helps avoid separation of the exhaust gas flow from the vane. This further optimizes the gas turning effect.

Each of said second group of vanes has a chord length h. Advantageously, the leading edge of each of said second group of vanes may be displaced axially from the region of maximum negative pressure by a distance of 25% of the chord length (h)+/−15% of the chord length (h).

As discussed above, the second group of vanes may extend from the central hub radially outwards towards the circumferential outer ring. Alternatively, or additionally, one or more of said second groups of vanes may extend radially inwards from the circumferential outer ring into the space defined between adjacent vanes in said first group. Thus, gas turning can be affected from the inner zone of the TRS, the outer zone of the TRS, or both.

The splitter vanes may advantageously be hollow in construction to minimise weight. This is particularly possible where the vanes are not load bearing vanes.

A turbine rear structure comprises a plurality of primary exhaust gas guide vanes extending radially from a central hub to a peripheral coaxial ring. the turbine rear structure further includes a plurality of intermediate exhaust gas guide vanes, wherein the intermediate exhaust gas guide vanes are arranged in the spaces defined between adjacent primary exhaust gas guide vanes, and wherein the intermediate vanes are located closer to one of the primary vanes than an opposing primary guide vane.

In effect, the intermediate or splitter vanes are offset from a mid-point between adjacent primary vanes. Thus, the space between adjacent primary exhaust gas guide vanes includes a pair of exhaust gas channels divided by the intermediate guide vane. One of the pair of channels may therefore have a larger cross-section than the second of the pair of channels.

A gas turbine engine comprises a turbine rear structure as described herein, and an aircraft comprises one or more gas turbine engines described herein.

A method of manufacturing a turbine rear structure comprises
(A) forming a central hub and a circumferential outer ring,
(B) connecting a plurality of a first group of guide vanes so at to extend between the central hub and the circumferential outer ring;
(C) positioning a second group of guide vanes between adjacent vanes of said first group,
wherein the second group of guide vanes are located asymmetrically with respect to adjacent vanes of said first group.

The vanes may be formed using any suitable process. Advantageously, the second group of guide vanes may be formed by an additive manufacturing process thereby allowing complex geometries to be achieved both internally and/or externally. This allows for still further optimisation. A more conventional way is to make the vanes out of sheet metal formed into the desired shape. Still further the turbine rear structure may be formed in its entirety by an additive manufacturing process.

BRIEF DESCRIPTION OF THE DRAWINGS

One or more embodiments of the disclosure will now be described, by way of example only, and with reference to the following figures in which.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The disclosure is further described with reference to the following examples. It will be appreciated that the disclosure as claimed is not intended to be limited in any way by these examples. It will also be recognised that the disclosure covers not only individual embodiments but also combination of the embodiments described herein.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilised and modifications may be made without departing from the spirit and scope of the disclosure. Various embodiments of the disclosure may suitably comprise, consist of, or consist essentially of, appropriate combinations of the disclosed elements, components, features, parts, steps, means, etc, other than those specifically described herein.

DETAILED DESCRIPTION

Figure 1A:
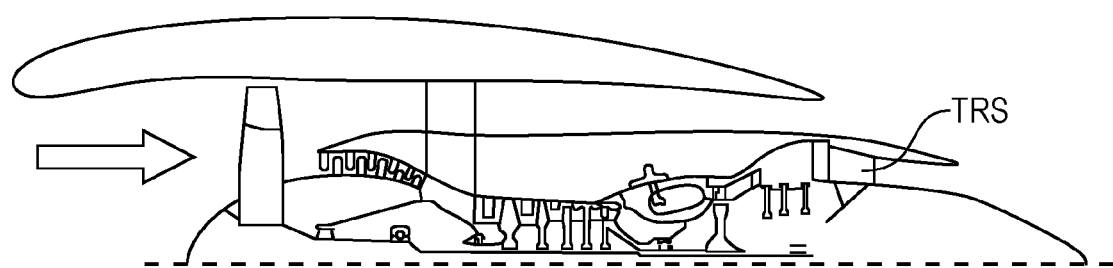
FIG. 1A shows a par cross-section through an engine identifying the Turbine Rear Section (TRS)

FIG. 1A shows the position of the turbine rear section (TRS) in a gas turbine engine.

Figure 1B:
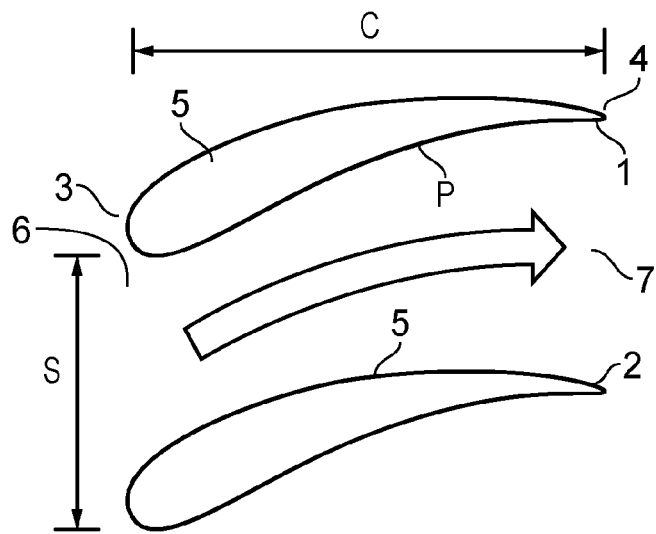
FIG. 1B shows a pair of adjacent guide vanes and solidity relationship.

FIG. 1B shows a cross-section through a pair of adjacent guide vanes for a turbine rear structure (TRS). The TRS is located at the rear of the engine and provides a number of functions. For example, the TRS provides the structural connection for the engine to the aircraft body through lugs or mounts, which are described below.

The TRS functions aerodynamically to cause exhaust gas that has been generated by the turbine in the engine to leave the engine in a generally axial direction—that is parallel with the axis of rotation of the shaft running along the centre-line of the engine.

Returning to FIG. 1B, two adjacent vanes 1, 2 are shown. Each vane comprises a leading edge 3 and a trailing edge 4 and an aerodynamic profile 5, consisting of a suction side S (primarily convex) and a pressure side P (primarily concave) extending there between on each side of the vane.

A TRS comprises a plurality of vanes and it will be recognised that the upper surface of vane 1 (shown in FIG. 1B) forms the upper surface of the next pair of vanes (corresponding to vane 2) around the circumference of the TRS (described further below). A vane passage is defined between adjacent vanes around the TRS.

The leading edges 3 of vanes 1, 2 define an inlet passage 6, which receives exhaust gas from the turbine. Similarly, the trailing edges 4 of the vanes 1, 2 define an outlet or exit 7 where exhaust gas leaves the TRS.

Between the leading and trailing edges 3, 4 the aerodynamic profile 5 acts to re-direct or turn the exhaust gas (as indicated by the arrow) so that the exhaust gas aligns more closely with the axis of the engine. This maximises the thrust generated by the exhaust gas by removing as much of the circulating component of the gas' movement as possible.

The circulating component of the exhaust gas is a result of the rotating and stationary turbine blades and vanes. This circulating or swirling component of movement can advantageously be harnessed to increase thrust.

Conventionally, the aerodynamic profile 5 is selected so that the leading edge 3 receives the circulating gas and vane passage (between adjacent vanes) guides or turns the gas by the appropriate amount. The precise shape of the profile 5 is therefore dependent on the particular performance of the engine.

As engines become more powerful and more compact, the component of swirl increases and thus a greater turning or re-directing effect is needed for the TRS to harness the exhaust gas energy for increased thrust. This has its own problems as described further below.

Figure 2:
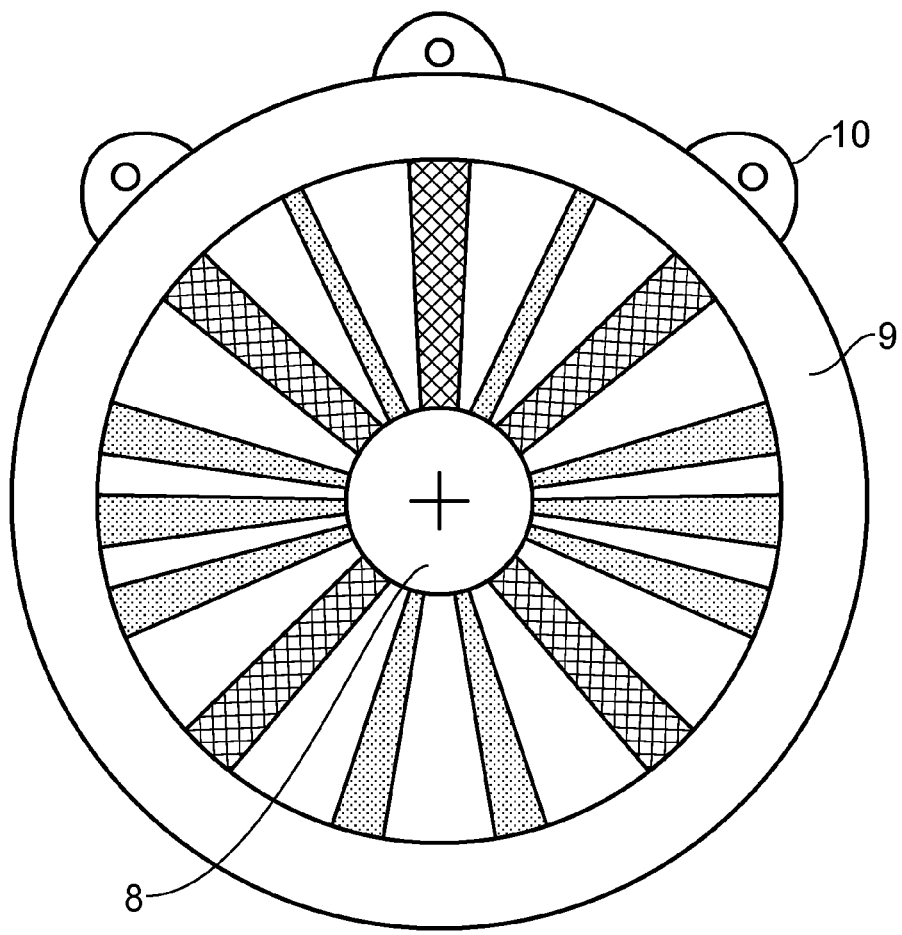
FIG. 2 shows a front to aft view of a turbine rear structure (TRS)

FIG. 2 is a 'fore looking aft' view of a TRS, i.e., looking in an exhaust gas flow direction. The TRS comprises a central hub 8 and an outer circumferential ring 9 which is coaxial with the central hub 8. The circumferential outer ring comprises a plurality of lugs 10 which may be connected to the aircraft body (for example a wing pylon).

Conventionally the TRS comprises a plurality of evenly spaced vanes extending from the central hub 8 to the circumferential outer ring 9 and which each have a profile as shown in FIG. 1B. The profile is, as described above, optimized for the specific engine.

FIG. 2 also illustrates the structural vanes (indicated by the hatched fill). The structural vanes provide the structural and load bearing connection between the central hub 8 and the circumferential outer ring 9. The structural vanes comprise the same cross-section as shown in FIG. 1B but comprise internal structures providing the load path between the central hub 8 and the engine mounting lugs. All of the vanes may be load bearing, or, alternatively, only some may be load bearing. Thus, non-load bearing vanes (indicated by the dotted fill) may be located adjacent to load bearing vanes.

As discussed above the profile of the vanes is optimized for the particular engine. An important parameter in TRS and vane design is the 'solidity' of the TRS vanes, which is a measure of how much material occupies the space between the central hub 8 and the circumferential outer ring 9 (noting that the TRS also has a length measured along the axis of the engine).

Solidity is calculated (referring to FIG. 1B) as the ratio of:

$$\text{Solidity} = c/s$$

where:
s is the pitch between adjacent vanes; and
c is the chord-wise length of the vane.

Typical State of the Art (SoA) solidity c/s is in the range of ~0.8 (0.4<c/s<1.2).

Figure 3:
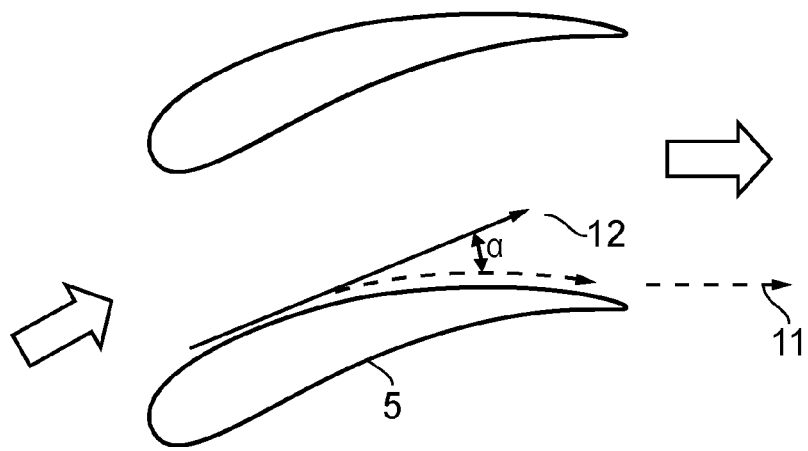
FIG. 3 shows how separation of air flow can occur in a guide vane.

FIG. 3 illustrates the limitation of conventional vane design. As described above, increases in engine power for modern engines increases the rotational component of gaseous flow within the engine. As the curvature of the aerodynamic portion increases (to accommodate the increased need to turn the circulating air in modern engines) the normal flow of air 11 shown by the dotted line in FIG. 3 begins to change.

Specifically, in normal operation, the airflow 11 flows along the inner surfaces of the vanes in a smooth manner. However, as the exhaust gas speed increases and the angle of turn becomes more aggressive (i.e., a greater turn angle), separation may occur as shown by line 12. The exhaust gas then departs from contact with the inner surface of the vane. Thus, an inefficient exhaust gas flow is created.

Figure 4:
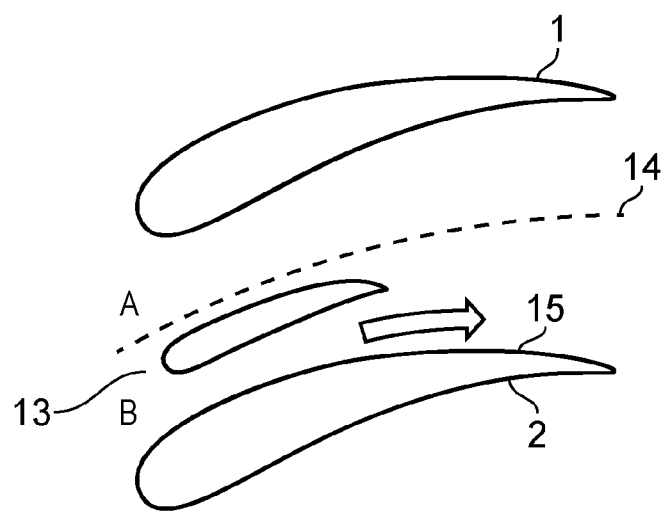
FIG. 4 shows an intermediate splitter vane described herein.

Turning to FIG. 4, a TRS described herein is shown.

The TRS comprises the same general vane arrangement 1, 2 as shown in FIG. 1B. However, the turbine rear structure further incudes an intermediate or splitter vane 13 located in the space between adjacent vanes 1, 2. In effect, the main vanes 1, 2 define a first group of vanes and the intermediate vanes 13 define a second group of vanes, where each intermediate vane 13 is located between two adjacent vanes 1, 2 in the first group.

As shown in FIG. 4, the intermediate vane 13 is asymmetrically positioned with respect to the two adjacent vanes 1, 2 of the first group. As shown by dotted line 14 the intermediate vane 13 is located 'off-centre' and closer to one vane 2 than the other vane 1 of the first group. This asymmetrical spacing is repeated in the space between adjacent vanes.

In effect, the intermediate vane 13 splits the channel between adjacent vanes 1,2 into two different flow paths identified by A and B in FIG. 4. It will thus be recognized that channel A is larger than channel B. Introducing a channel difference in this way advantageously prevents separation of exhaust gas flowing along surface 15. Thus, reducing separation of exhaust gas allows for a greater turn angle to be achieved for a given engine.

This provides a number of synergistic advantages including:
The exhaust gas departure angle can be optimized without separation;
A greater turn angle can be achieved in a shorter chord distance of the vane, which means the TRS can be shorter and lighter than a conventional TRS; and
A higher turbine power extraction/output can be used whilst optimising exhaust gas thrust from the rear of the TRS.

Figure 5:
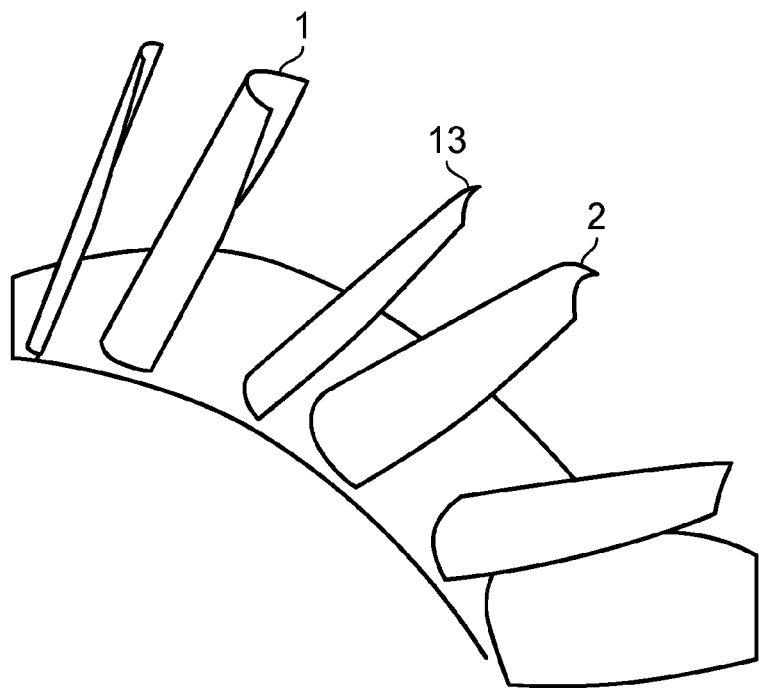
FIG. 5 shows a perspective view of the intermediate guide vanes between two adjacent guide vanes.

FIG. 5 shows a portion of the circumference of the central hub 8 of the TRS described herein. As shown, the intermediate vane 13 is located closer to vane 2 than vane 1 creating the dissimilar flow channels on either side of the intermediate vane 13.

The weight increase caused by the additional intermediate vanes 13 can be compensated for by making only a subset of the first group of vanes load bearing vanes, i.e., the number of main vanes (the first group of vanes) may be reduced, which can reduce the weight.

Depending on the exact requirements, the TRS described herein allows for a reduction in the number of load bearing vanes (these vanes including the internal load bearing struts or members), an increase in the number of intermediate vanes, or retaining the same number of load bearing vanes and including the intermediate vanes 13. With the same number of vanes plus splitter vanes 13 in between, a larger turning angle can be obtained.

Figure 6:
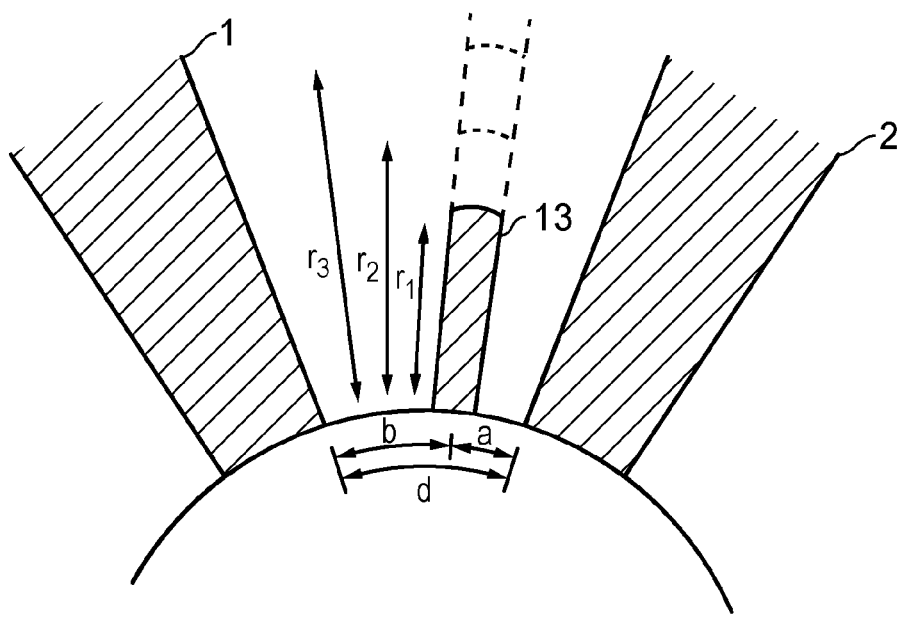
FIG. 6 shows the positioning of the intermediate guide vane with respect to two adjacent guide vanes.

FIG. 6 shows an end view of the TRS illustrating the positioning of the intermediate vane 13 with respect to the two opposing vanes 1, 2.

As shown the intermediate vane 13 is not positioned centrally with respect to the two adjacent vanes 1, 2 but instead is closer to vane 2 than vane 1. Vane 2 represents the vane that is upstream of vane 1 in respect of the flow of circulating exhaust gas, i.e., exhaust gas impinges against vane 2 first. Thus, each intermediate vane 13 is located closer to the 'upstream' vanes of the TRS as opposed to the downstream side.

The intermediate vane 13 may be located at any position that is asymmetrical with respect to the vanes 1, 2. However, the intermediate vane 13 may be advantageously positioned approximately $\frac{1}{3}^{rd}$ of the distance between the two adjacent vanes 1, 2.

Figure 8:
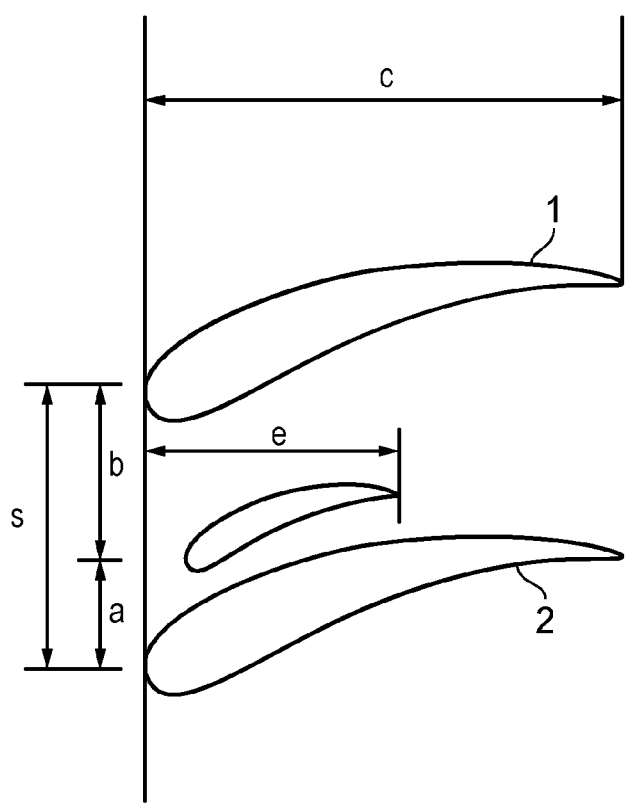
FIG. 8 shows the chord-wise length of the intermediate vane with respect to two adjacent guide vanes.

Referring to FIGS. 6 and 8, advantageously, the following conditions may be met to optimize the performance of the TRS:

$$a<b$$

$$a = \frac{1}{3} \text{ of } d +/- \frac{1}{6} \text{ of } d$$

where d is equal to the pitch s shown in FIG. 1B.

FIG. 6 also illustrates the radial extent of the intermediate vane 13 from the central hub 8 may be selected so that the intermediate vane 13 terminates part way across the radius between the central hub 8 and the circumferential outer ring 9.

As shown in FIG. 6, the intermediate vane 13 may extend a predetermined distance from the central hub 8 depending on the specific parameters of the given engine. For example, the intermediate vane 13 may extend to $r_1$, $r_2$ or $r_3$, i.e, increase radii, from the central hub 8. Each intermediate vane 13 may extend by the same distance or alternating or groups of intermediate vanes 13 may extend by different distances.

In an alternative arrangement, all or a subset of vanes may extend the full radius between central hub 8 and the circumferential outer ring 9.

Figure 7:
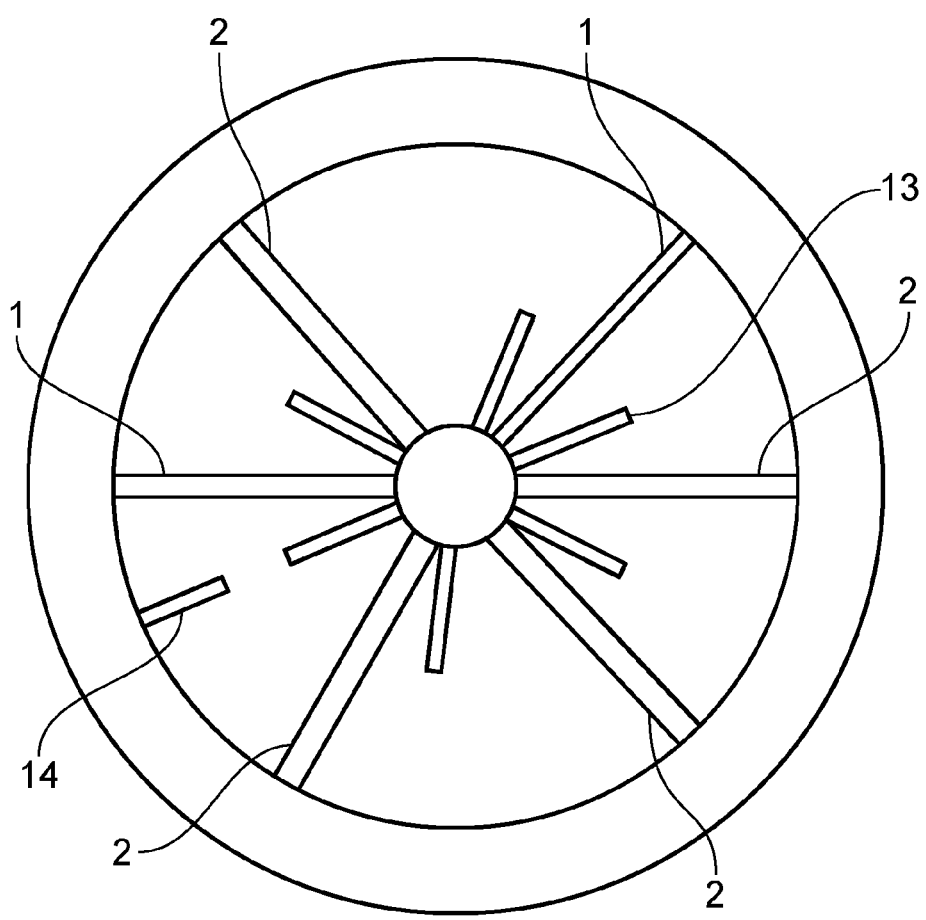
FIG. 7 shows the radial arrangement of intermediate guide vanes.

This is illustrated in FIG. 7 where the load bearing vanes 1, 2 can be seen with intermediate vanes 13 located asymmetrically there between and terminating at a radius less than the full radius of the circumferential outer ring 9 (measured from the central hub 8).

Advantageously, terminating the intermediate vanes 13 at a distance less than the full radius of the circumferential outer ring 9 provides a number of advantages including (but not limited to):
there is no thermal loading of the intermediate vane 13. Providing the intermediate vane 13 with a free end allows the intermediate vane 13 to expand as it heats (from the hot exhaust gas) without being compressed against the circumferential outer ring 9;
each intermediate vane 13 can be selected so as to be optimized to direct circulating exhaust gas at the location of greatest circulation. The swirl or circulating component of the flow is in general strongest at the hub 8 and decreases toward the circumferential outer ring 9. Thus, the intermediate vanes 13 are most effective at the centre; and
the weight of each intermediate vane 13 can be minimized since the intermediate vane 13 only extends to a distance where it provides an advantageous effect.

FIG. 7 also illustrates a further feature of radially inwardly extending intermediate vanes 14. Such radially inwardly extending vanes may be used where circulating exhaust gas requires re-direction at the inner surface of the circumferential outer ring 9. This may be advantageously positioned at the same $\frac{1}{3}^{rd}$ spacing described above. As shown in FIG. 7, the inwardly extending intermediate vane 14 may align with the outwardly extending intermediate vane 13. It may also be used in isolation.

FIG. 8 shows the chord-wise length and position of the intermediate vanes 13 with respect to the adjacent vanes 1, 2.

The intermediate vanes 13 may advantageously extend in a chord-wise direction by a particular distance. Specifically, the following condition must be satisfied to optimize the TRS:
e ranges between 20% of c and 100% of c
Advantageously:

$$e = \frac{1}{2} \text{ of } c$$

Figure 9A:
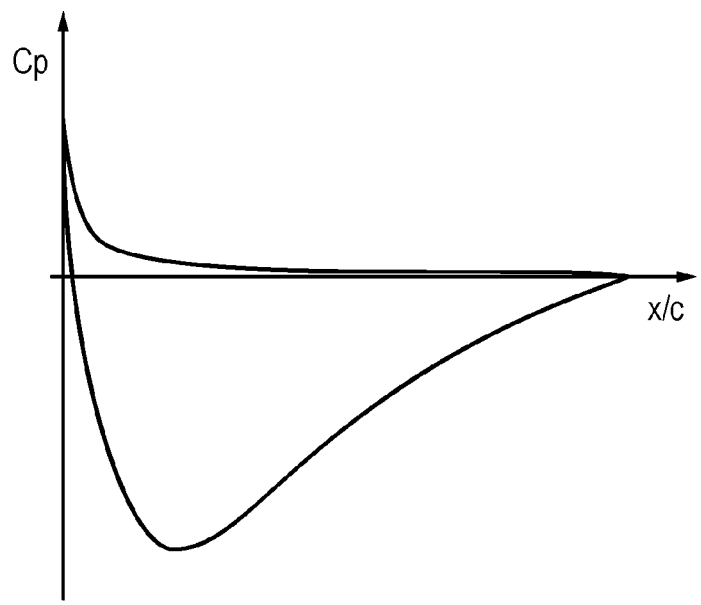
FIGS. 9A and 9B show the pressure distribution along the length of the vane with and without the splitter vane described herein.
Figure 9B:
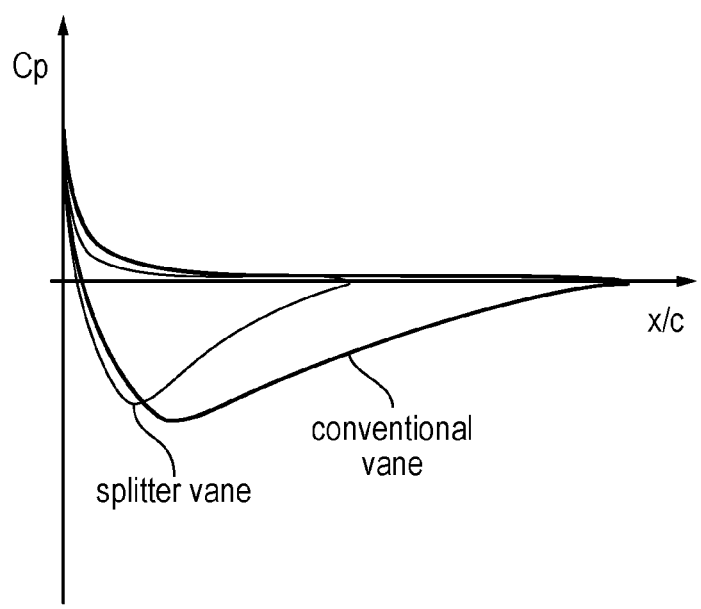

FIGS. 9A and 9B show the pressure distribution along the length of the vane 2 with and without the splitter vane 13 described herein. Each graph shows pressure on the y axis and axial position on the x axis and illustrates the negative pressure which is created on the convex face of the vane 2, i.e., the upper side of the vane 2 as shown, for example, in FIG. 1B.

The difference in pressure profiles and the lowest pressures (suction peak) can be seen in each figure. Specifically, the magnitude of negative pressure is clearly shown to be significantly different between a conventional arrangement of 9A and the arrangement including a conventional vane 2 and splitter vane 13. As shown in 9B, the magnitude of negative pressure for both the conventional vane 2 and the splitter vane 13 are reduced.

It will be recognised that a reduction in the peak negative pressure (the suction peak) reduces the chance of air (exhaust) gas flow separation from the surface of the vane 2. By maintaining contact with the vane 2, the turning ability of the vanes 1, 2 is increased. Advantageously, as shown in FIG. 9B, the negative peak pressure on both the load bearing conventional vanes 1, 2 and the splitter vanes 13 are reduced and thus the chance of separation is also reduced. The turning ability of both vanes 1, 2 is therefore increased.

Figure 10A:
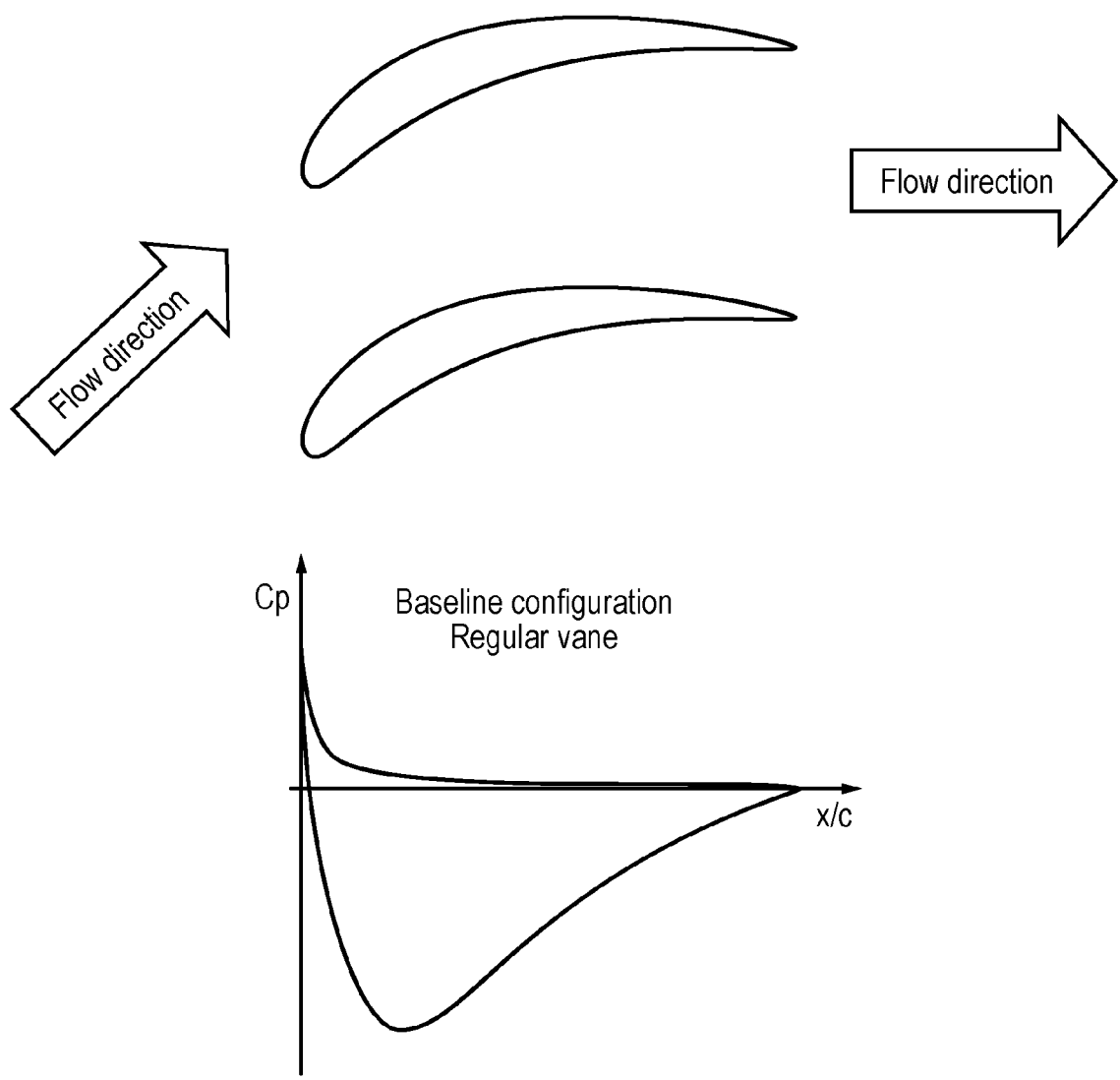
FIGS. 10A and 10B show FIGS. 9A and 9B with the respective conventional vane and splitter vane arrangements.

FIG. 10A shows the same regular vane pressure distribution as shown in FIG. 9A. However, in FIG. 10A the graph is aligned with the vane 2 illustrating the locations of the respective (negative) pressures along the axial direction x/c.

Figure 10B:
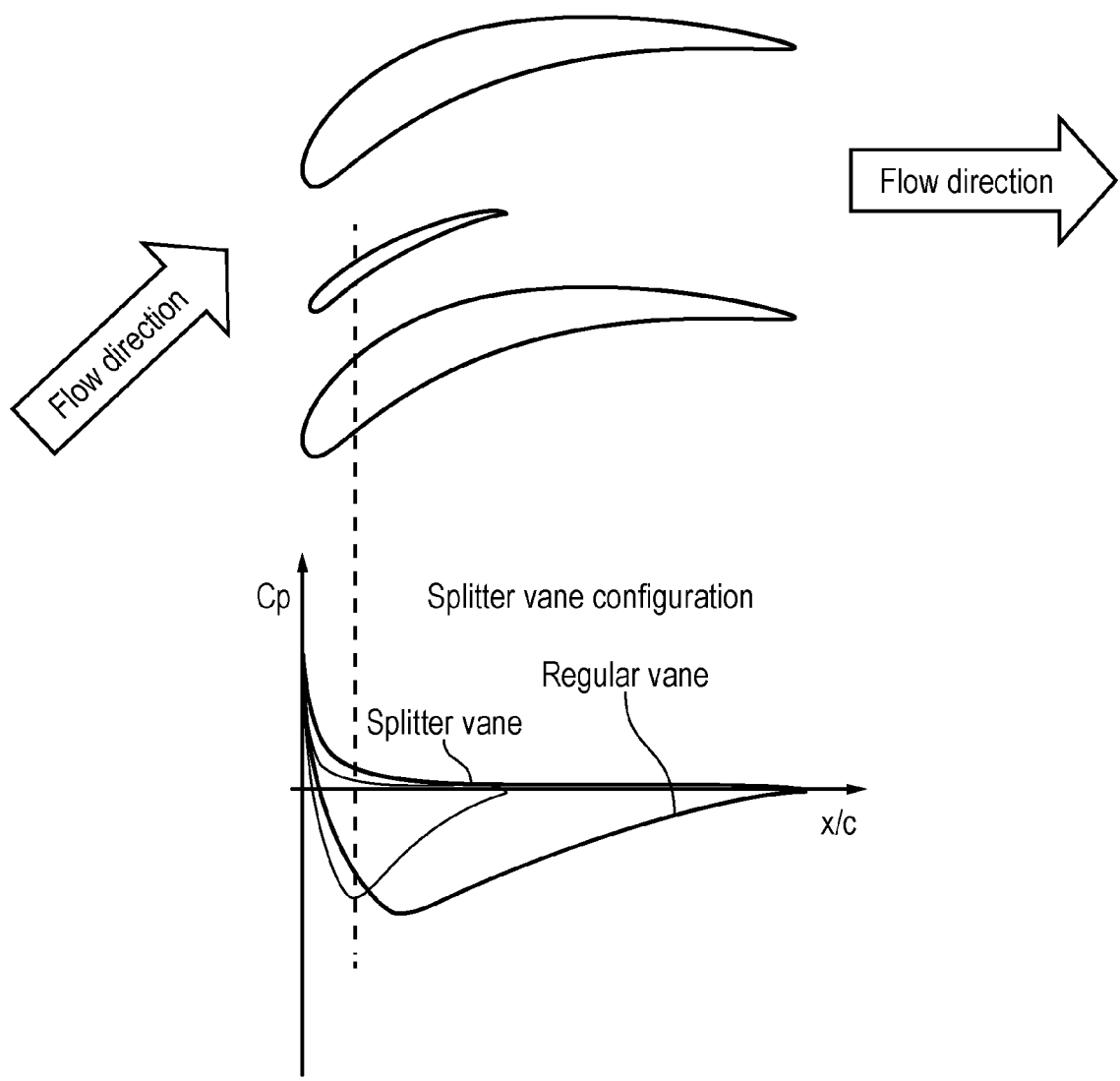

FIG. 10B shows the effect of the splitter vane 13 in alignment with the vane 2. The dashed line in FIG. 10B illustrates the position of the pressure peak on the splitter vane 13.

Figure 11A:
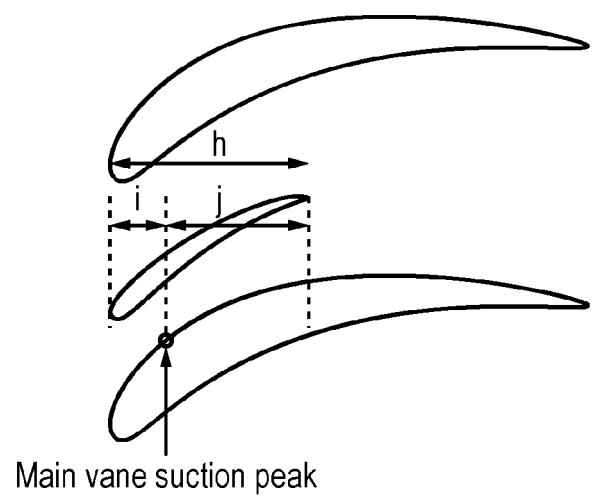
FIGS. 11A, 11B and 11C illustrate the axial position of the splitter vane with respect to the suction peak.
Figure 11B:
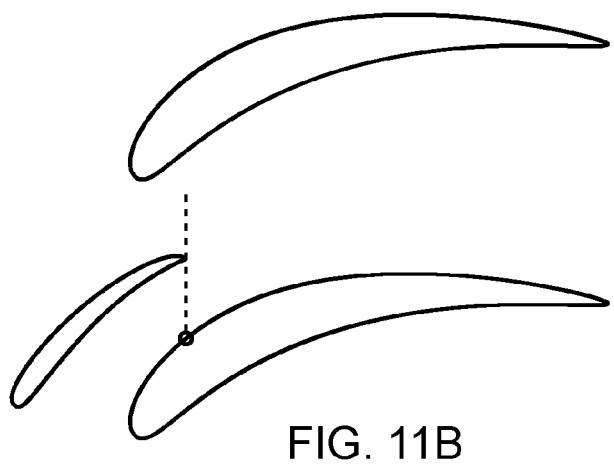
Figure 11C:
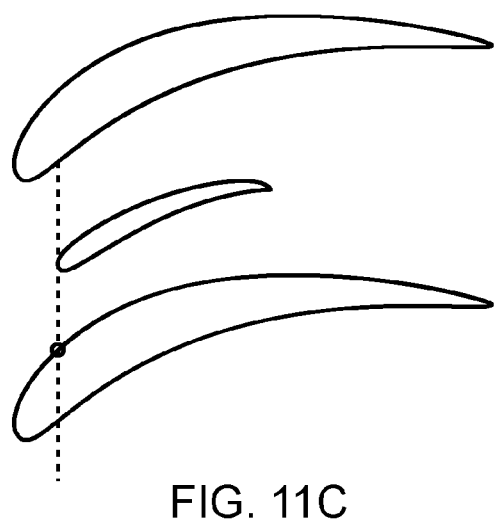

FIGS. 11A, 11B and 11C illustrate the axial position of the splitter vane 13 with respect to the suction peak described above.

Referring to FIG. 11A, the suction peak point is illustrated by the circle positioned on the convex side of the vane 2.

The relationship between the position of the splitter vane 13 with respect to the suction peak is:

Splitter vane (axial) chord: $h = i + j$

0% of $h \leq i \leq$ 100% of $h$

Thus, the splitter vane 13 must be located such that at least a part of the splitter vane 13 is located over the suction peak. More specifically, it has been established that the optimum position of the suction peak lies within the range of $i = 25\% \pm 15\%$ of $h$.

FIGS. 11B and 11C illustrate the two extreme positions of the splitter vane 13. The splitter vane 13 needs to overlap the suction peak region, i. e., the splitter vane 13 leading edge (LE) cannot be further downstream than the main vane 2 suction peak (see FIG. 11C) and the splitter vane 13 trailing edge (TE) cannot be further upstream than the main vane 2 suction peak (see FIG. 11B).

Figure 12A:
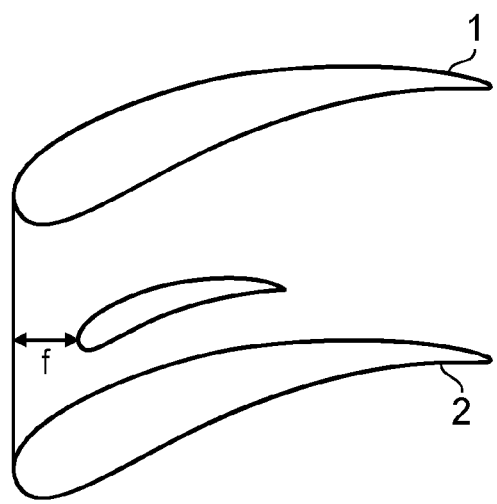
FIGS. 12A and 12B show two arrangements of chord-wise position of the intermediate vane with respect to the adjacent vanes.
Figure 12B:
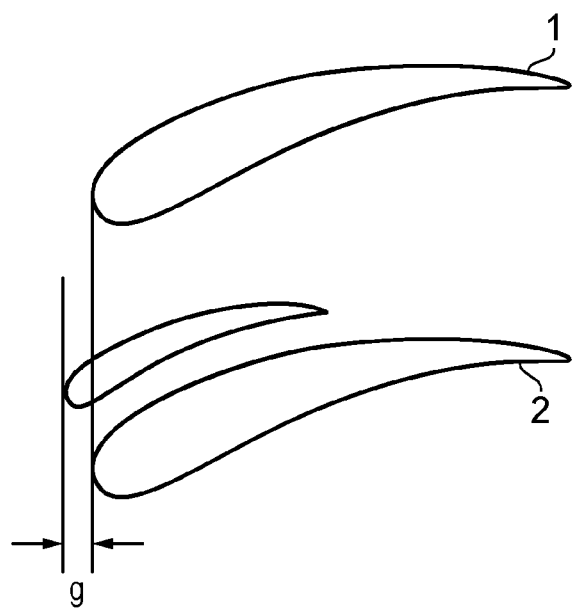

FIGS. 12A and 12B show two arrangements of chordwise position of the intermediate vane 13 with respect to the adjacent vanes 1, 2.

FIGS. 12A and 12B illustrate two alternative positions of the intermediate vane 13. In FIG. 12A, the intermediate vane 13 is recessed by distance f within the space defined between the adjacent vanes 1, 2. In FIG. 12A, there is increased incidence robustness compared to a configuration without the splitter vanes 13.

Conversely, FIG. 12B illustrates an arrangement when the intermediate vane 13 leads or extends beyond the leading edge of the vane 2 by distance g. In FIG. 12B, there is the potential to reduce the upstream forcing on the rotor (static pressure disturbances impacting the upstream turbine rotor in a negative way).

The arrangements described herein may be manufactured using any suitable technique such as casting, conventional machining, or hydroforming. These techniques allow the aerodynamic shapes to be formed to define the desired geometry which is itself defined by the particular engine.

Additive manufacturing techniques may also be conveniently used to form either components of the TRS (such as the intermediate vanes 13) or to form the entire TRS. Additive manufacturing techniques involve building up a 3-dimensional shape as a series or layers, for example, using a powder bed technique such as laser beam melting or the like. Intricate geometries may be conveniently formed with minimal material wastage.

The described embodiment may be particularly beneficial when the aero-surfaces are formed of sheet material, which is known in the field as a fairing design.

Example materials for the vanes 1,2 and splitter vanes 13 include Inconel 718, Haynes 282 or other similar superalloys or combinations thereof.

Example sizes of the splitter vanes may be as follows:

In a first example (Engine 1) each splitter vane 13 may be 800 mm in radius, vane chord c=250 mm with 14 vanes in the TRS.

In a second example (Engine 2) each splitter vane 13 may be 450 mm in radius, vane chord c=170 mm, with 10 vanes in the TRS.

Examples of additive manufacturing techniques that may be used to form all or part of an invention described herein include but are not limited to:

Powder bed fusion methods;
Direct metal laser sintering (DMLS);
Electron beam melting (EBM);
Selective laser melting (SLM);
Selective laser sintering (SLS);
Direct metal wire deposition; and
Direct metal powder deposition.

The invention claimed is:

1. A turbine rear structure for a gas turbine engine comprising:
   a central hub;
   a circumferential outer ring coaxial with the central hub;
   a plurality of guide vanes extending radially between the central hub and the circumferential outer ring; and
   an intermediate guide vane positioned in a space defined between adjacent guide vanes of the plurality of guide vanes, wherein the intermediate guide vane is positioned closer to one of the guide vanes than the other guide vane;
   wherein the adjacent guide vanes include an upstream vane and a downstream vane relative to an exhaust gas flow direction, and the intermediate guide vane is positioned closer to the upstream vane than the downstream vane.

2. The turbine rear structure of claim 1, wherein the intermediate guide vane is positioned from the upstream vane one-third of a distance across the space defined between adjacent guide vanes, plus or minus one-sixth of the distance.

3. The turbine rear structure of claim 1, wherein one or more of the plurality of guide vanes are load bearing vanes connecting the central hub and the circumferential outer ring.

4. The turbine rear structure of claim 1, wherein the intermediate guide vane is a load bearing vane connecting the central hub and the circumferential outer ring.

5. The turbine rear structure of claim 1, wherein the intermediate guide vane has a first end coupled to the central hub and a second end radially spaced from the circumferential outer ring.

6. The turbine rear structure of claim 5, further comprising a second intermediate guide vane positioned in a space between second adjacent guide vanes, wherein the second intermediate guide vane includes a first end coupled to the central hub and a second end radially spaced from the circumferential outer ring, and wherein the second end of the intermediate guide vane is spaced farther from the circumferential outer ring than the second end of the second intermediate guide vane.

7. The turbine rear structure of claim 1, wherein the intermediate guide vane extends in an axial direction of the turbine rear structure to a distance not exceeding fifty percent of a full chord-length of the adjacent guide vanes.

8. The turbine rear structure of claim 7, wherein a leading edge of the intermediate guide vane is displaced in the axial direction so that the leading edge of the intermediate guide vane is downstream of leading edges of the adjacent guide vanes in the exhaust gas flow direction.

9. The turbine rear structure of claim 7, wherein a leading edge of the intermediate guide vane is displaced in the axial direction so that the leading edge of the intermediate guide vane is upstream of leading edges of the adjacent guide vanes in the exhaust gas flow direction.

10. The turbine rear structure of claim 1, wherein an outer convex surface of each of the guide vanes has a point of maximum negative pressure and wherein the intermediate guide vane is arranged to overlap the point of maximum negative pressure.

11. The turbine rear structure of claim 10, wherein the intermediate guide vane has a chord length and wherein a leading edge of the intermediate guide vane is displaced axially from the point of maximum negative pressure by a distance of twenty-five percent plus or minus fifteen percent of the chord length.

12. The turbine rear structure of claim 1, wherein the intermediate guide vane extends radially outward from the central hub into the space defined between the adjacent guide vanes.

13. The turbine rear structure of claim 12, further comprising a second intermediate guide vane positioned in the space between adjacent guide vanes, the second intermediate guide vane extends radially inward from the circumferential outer ring towards the intermediate guide vane.

14. The turbine rear structure of claim 1, wherein the intermediate guide vane extends radially inward from the circumferential outer ring into the space defined between the adjacent guide vanes.

15. The turbine rear structure of claim 1, wherein the intermediate guide vane is hollow.

16. The turbine rear structure of claim 1, wherein the space between the adjacent guide vanes comprises a pair of exhaust gas channels divided by the intermediate guide vane.

17. A method of manufacturing a turbine rear structure comprising:
   (A) forming a central hub and a circumferential outer ring,
   (B) connecting a plurality of guide vanes to extend radially between the central hub and the circumferential outer ring; and
   (C) positioning an intermediate guide vane between adjacent guide vanes of the plurality of guide vanes, wherein the intermediate guide vane is located asymmetrically with respect to the adjacent guide vanes;
   wherein the adjacent guide vanes include an upstream vane and a downstream vane relative to an exhaust gas flow direction, and the intermediate guide vane is positioned closer to the upstream vane than the downstream vane.

18. The method of claim 17, further comprising forming the intermediate guide vane by additive manufacturing process.

19. The method of claim 17, further comprising forming the intermediate guide vane and the plurality of guide vanes from sheet metal.

\* \* \* \* \*

UNITED STATES PATENT AND TRADEMARK OFFICE
CERTIFICATE OF CORRECTION

PATENT NO. : 11,230,943 B2  
APPLICATION NO. : 16/761836  
DATED : January 25, 2022  
INVENTOR(S) : Fredrik Wallin Page 1 of 1

It is certified that error appears in the above-identified patent and that said Letters Patent is hereby corrected as shown below:

In the Claims

Column 12, in Line 36-37, Claim 18 replace "manufacturing process." with -- manufacturing. --.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*